United States Patent Office 3,740,426
Patented June 19, 1973

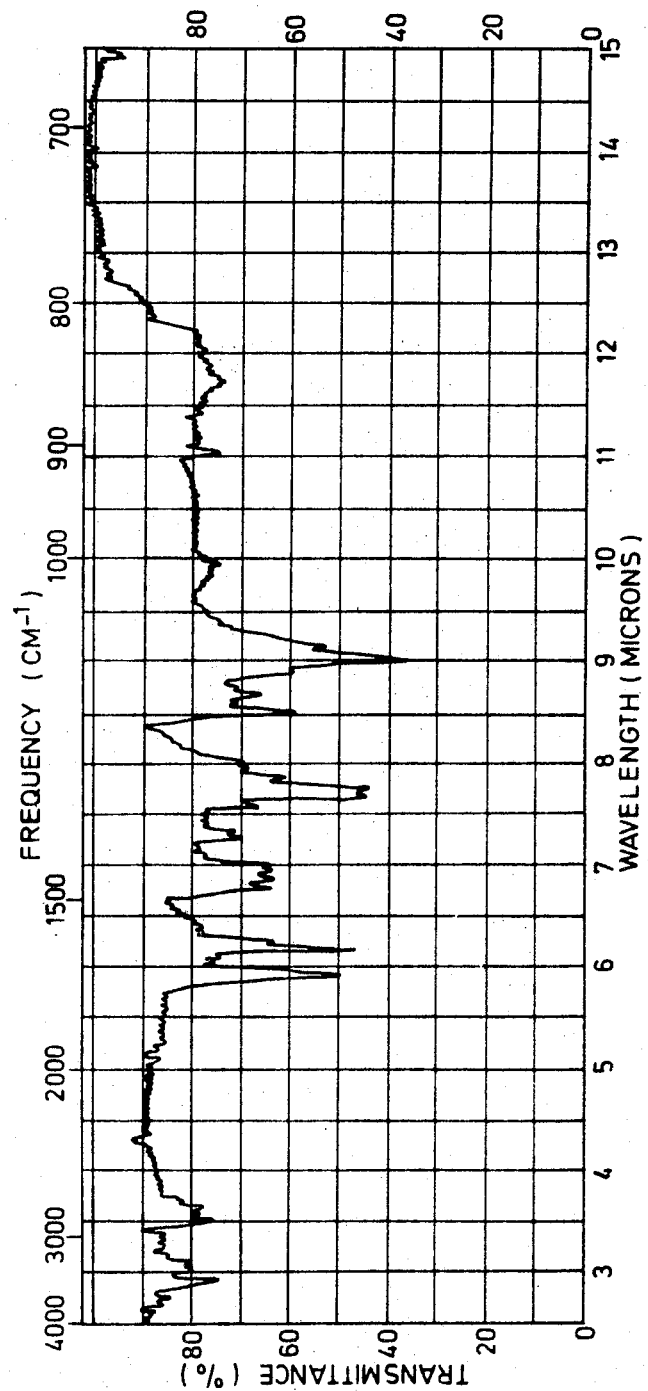

3,740,426
PHARMACOLOGICALLY EFFECTIVE SUBSTANCE FOR LOWERING BLOOD PRESSURE AND PROCESS FOR ISOLATING IT FROM *CABUCALA MADAGASCARIENSIS*
Alfred Groebel, Bad Soden, Taunus, and Ernst Lindner, Frankfurt am Main, Germany, assignors to Farbwerke Hoechst Aktiengesellschaft vormals Meister Lucius & Bruning, Frankfurt am Main, Germany
Filed Mar. 9, 1971, Ser. No. 122,359
Claims priority, application Germany, Mar. 11, 1970, P 20 11 553.1
Int. Cl. A61k 27/00
U.S. Cl. 424—195     8 Claims

ABSTRACT OF THE DISCLOSURE

A pharmacologically active substance having blood pressure lowering activity, isolated from *Cabucala madagascariensis*. Pharmaceutical compositions containing this active substance. Process for isolating the active substance from the plant material by extraction and purification.

---

The present invention relates to a pharmacologically active substance, to methods of isolating the same from *Cabucala madagascariensis*, and to pharmaceutical compositions containing the active substance.

*Cabucala madagascariensis* is a shrub belonging to the family Apocynaceae which is found in the sclerophyllous woods of the western coast of Madagascar [cf. M. Pichon, "Notulae Systematicae" XIII (1948), pages 202–203].

It is already known that *Cabucala madagascariensis* contains a crystalline pharmacologically effective substance having blood pressure lowering properties. This substance is obtained according to the process described in Belgian Pat. 710,860 (corresponding with U.S. Pat. 3,565,990) by extracting dried material of this plant, preferably the stems thereof, with a lower alcohol, if desired after a previous extraction to remove fats, waxes and sterols, extracting the dry residue of the alcoholic extract by means of dilute acids, rendering the acidic solution alkaline, extracting the precipitate that has separated successively with ether or with a halohydrocarbon, for example chloroform, and a lower alcohol, and chromatographing the residue of the alcoholic solution. The effective substance is obtained by elution with neutral eluants, for example chloroform/acetone and benzene/acetone.

It has now been found that the chloroform extract of the product obtained by the alkaline precipitation, which extract has not been investigated up to now, contains another substance having a strong long-lasting blood pressure lowering action.

Accordingly, the present invention provides a process for the isolation of a pharmacologically effective substance form *Cabucala madagascariensis*, wherein dried *Cabucala madagascariensis* is extracted with an alcohol having 1 to 4 carbon atoms or with an aliphatic halohydrocarbon having 1 to 3 carbon atoms and up to 3 halogen atoms, preferably chlorine atoms, and the effective substance is isolated from the dried residue of this extract.

It is advisable to use branches, stems and roots of dried *Cabucala madagascariensis* and to submit them to a previous extraction in order to eliminate the major quantity of plant fats, waxes and stherols. For this purpose hydrocarbons having 5 to 7 carbon atoms, preferably petroleum ether, pentane or hexane, in a ratio of from 1:2 up to 1:5 parts by weight of drug to solvent, are used.

For extracting the effective substance from *Cabucala madagascariensis*, low molecular weight alcohols, suitably those having 1 to 4 carbon atoms, or aliphatic halohydrocarbons having 1 to 3 carbon atoms and up to 3 halogen atoms, preferably up to 3 chlorine atoms, are used. Among these extraction agents, methanol or ethanol, on the one hand, and, on the other hand, tri-chloroethylene, and tri-chloro-ethane, especially methylene-chloride and chloroform are preferred. The extracting agents are suitably used in a proportion of from 1:2 up to 1:6 parts by weight of drug to extraction agent.

The extract is then dried, for example by removing the solvent by distillation under atmospheric pressure or, suitably, under reduced pressure. Minor residues of solvent can be eliminated by drying under strongly reduced pressure or at an elevated temperature.

The active substance is then extracted from the solid residue by treatment with an acid. As mineral acids, hydrochloric or sulfuric acid may be used, for example; as an organic acid, for example acetic acid may be used. The acids are used in concentrations of from 0.1 to 4 N; it is preferred to use concentrations of from 0.5 to 2 N. The use of mineral acids having a higher concentration yields extracts which contain a higher proportion of decomposition products. Organic acids such as acetic acid, however, may also be used in higher concentrations.

The acidic solution of the active substance is then rendered alkaline by means of potassium hydroxide solution, sodium hydroxide solution or ammonia, the pH optimum being in the range of from 8 to 9. The precipitate is filtered off, dried and then separated from the major part of the accompanying substances by extraction with ether. The precipitate is then extracted by means of an aliphatic halohydrocarbon having 1 to 3 C-atoms and up to 3 halogen atoms, especially chlorine atoms; it is preferred to use methylene-chloride or chloroform. The extractions may be carried out, for example in a Soxhlet extractor, at elevated temperature.

Upon evaporation of the solvent from the extract of the precipitate, the crude active substance is obtained in the form of a red brown amorphous solid residue.

Further purification of the crude active substance may be effected, for example by adsorption chromatography. As adsorbant, silica gel or aluminum oxide is preferably used. As eluants, lower alcohols such as methanol, ethanol, propanol, isopropanol or butanol to which minor amounts of a base are added are especially suitable. The mixtures isopropanol/ammonia 19:1 and ethanol/ammonia 8:2 in parts by volume have proved to give very good results. Mixtures of isopropanol with bases have excellent separating selectivity but the absorption zones migrate rather slowly.

Upon evaporation of the eluate, the active substance is obtained in the form of an odorless crystalline substance having a yellow-brown colour. It can be purified by recrystallization from a lower alcohol, for example methanol, absolute ethanol or propanol in the form of colorless needles and rodlets. After drying over $CaCl_2$ at 50° C. under strongly reduced pressure, the active substance was found to melt at 167.5° C.

Determination of the molecular weight from the mass spectrum gave the value of 382. Quantitative analysis yielded the following values:

| | Percent |
|---|---|
| C | 69.6 |
| H | 7.1 |
| N | 7.3 |
| O | 16.6 |

Accordingly, the empirical formula was found to be $C_{22}H_{26}O_4N_2$.

The active substance is further characterized by the following physical data:

Thin-layer chromatography on silica gel GF (Merck, Darmstadt)

(1) Chloroform/acetone 1:1, RF value 0.74
(2) Isopropanol/ammonia 19:1, RF value 0.81

The UV-spectrum in methanol showed the following absorption bands:

$\lambda max_1 = 227$ m$\mu$, log $\epsilon = 4.54$
$\lambda max_2 = 279$ m$\mu$, log $\epsilon = 3.95$ For the infrared spectrum in $CHCl_3$, see the accompanying drawing.

The reactions of the above-mentioned substance with Dragendorff's reagent (bismuth carbonate+sodium iodide in glacial acetic acid and ethyl acetate, addition of tartaric acid) and hexaiodoplatinate (5% hexachloroplatinic (IV) acid+potassium iodide in water) were positive.

The active substance of the invention may be converted into a salt with a physiologically tolerated acid, for example with hydrochloric acid, sulfuric acid, acetic acid or tartaric acid.

The new active substance of the invention has an excellent blood pressure lowering acitivity. For example, it provokes in a dog, when administered in a dose of 0.5 mg./kg. of body weight, an average reduction of the blood pressure of 35 mm. Hg and, in a dose of 0.5 mg./kg. of body weight, an average reduction of the blood pressure of 50 mm. Hg. With lower dosages, the reduction lasts on the average for 2 hours. If high doses are used, the effect lasts correspondingly longer.

The blood pressure lowering action of the new active substance was tested in the animal experiments described hereinafter.

The active substance was injected intramuscularly to dogs having an increased blood pressure after surgical narrowing of both renal arteries. The injections of 0.2 mg./kg. of body weight were given on 4 successive days. The lowering of the blood pressure is shown in the following Table I.

TABLE I.—BLOOD PRESSURE TESTS IN DOGS BEFORE AND AFTER DAILY INTRAMUSCULAR INJECTIONS OF 0.2 MG./KG. OF THE ACTIVE SUBSTANCE ACCORDING TO THE INVENTION

| Dog | Measurements | Control 1 | Control 2 | After 2 injections | After 4 injections |
|---|---|---|---|---|---|
| I | Blood pressure, mm. Hg | 220/90 | 210/85 | 165/70 | 150/51 |
|   | Heart frequency beats/minute | 93 | 120 | 117 | 80 |
| II | Blood pressure, mm. Hg | 200/90 | 225/110 | 205/90 | 130/66 |
|    | Heart frequency beats/minute | 99 | 75 | 82 | 66 |

During the treatment the dogs showed a slight sedation in their total behavior. This sedative side-effect, which becomes apparent, for example, in the reduction of the motility of the animals, was essentially lower in comparison to that produced by doses of reserpine having a corresponding action on the blood pressure. (A strong sedation is undesired). After termination of the treatment the reduction of the blood pressure lasted for several days and the blood pressure returned only slowly to the (increased) starting value. The electrocardiogram and the body weight of the animals remained unchanged.

Simultaneously with the lowering of the blood pressure of the animals, the peripheral blood flow was increased; the heart frequency remained practically unchanged, likewise the frequency of respiration.

The toxicity of the new active substance is low: the $DL_{50}$ is, on intravenous application to mice and rats, 35 mg./kg. of body weight. On peroral administration to mice, the $DL_{50}$ is 300 mg./kg. of body weight.

Because of its excellent blood pressure lowering properties, the new substance is generally suitable for the treatment of cardiac and circulatory disorders, for example, chronic hypertonia, cardiac insufficiently, Angina Pectoris and disorders of the blood circulation. The substance can be administered orally or intravenously, the doses ranging between 1 and 50 mg. per day, according to the severity of the disease and the weight of the patient.

For oral administration, especially tablets or dragées may be used which contain the active substance in a quantity ranging from 1 to 50 mg. per dosage unit, in addition to the usual adjuvants and carriers, for example talc, starch, lactose etc. For intravenous administration, solutions of the active substance in water with addition of a solubilizer such as propylene-glycol or solutions in propylene-glycol are preferably used.

The following examples illustrate the method for isolating the active substance from *Cabucala madagascariensis*.

EXAMPLE 1

4.7 kg. of ground branches and stems of *Cabucala madagascariensis* were freed in a Soxhlet extractor from plant fats, waxes and sterols with the aid of 20 liters of petroleum ether. Branches and stems were then extracted in the same extractor for about 8 hours at 28 to 35° C. with 45 liters of methylene chloride. As soon as the overflow became colorless, the extract was filtered and dried under reduced pressure. The dry residue amounted to 35 g. and was stirred with 150 ml. of 0.2 N-sulfuric acid at room temperature. After filtration, the sulfuric acid solution (pH 3.7) was adjusted to pH 8.5 by means of concentrated pure ammonia solution. Thereupon, a yellow amorphous precipitate separated. The precipitate was filtered off, washed with water and dried under strongly reduced pressure at 40° C.; 9.4 g. of product were obtained.

The product obtained by the precipitation with ammonia was extracted exhaustively at first with 120 ml. of ether and then with 200 ml. of chloroform. The ether solution contained undesired accompanying substances and was rejected. The chloroform extract was evaporated. The residue of this extract weighed 8.2 g. It was introduced into a 70 cm. long column of 500 g. of silica gel having a grain size of 0.05 to 0.2 mm., the column having been prepared by flowing in the silica gel with chloroform and allowing it to settle. At first, some impurities contained in the residue were eluted with 1 liter of chloroform as a brown zone. Then, the active substance was eluted with a mixture of isopropanol and concentrated ammonia in a proportion by volume of 19:1 as characteristic light yellow zone.

Upon concentration of the eluate, the active substance crystallized. For purification, it was recrystallized from absolute alcohol in the form of colorless needles melting at 167.5° C. The yield of pure active substance was 1.07 g.

EXAMPLE 2

6.8 kg. of ground branches and stems of *Cabucala madagascariensis* were freed from fat as described in Example 1 by means of petroleum ether and then extracted for 8 hours at about 50° C. in a Soxhlet extractor with 60 liters of methanol. The overflow was then colorless. The extract was filtered and dried under reduced pressure. The dry residue amounted to 61 g. and was stirred at room temperature with 150 ml. of 0.5 N-sulfuric acid. After filtration, the sulfuric solution (pH 3.4) was adjusted to pH 9 by means of concentrated ammonia solution, whereupon a yellow amorphous precipitate separated. The precipitate was filtered off, washed with water and dried under strongly reduced pressure at 40° C. 13.1 g. of product were obtained.

The dry product obtained by the precipitation with ammonia was then washed with 100 ml. of ether and extracted exhaustively with 150 ml. of methylene chloride in a Soxhlet extractor. The methylene chloride solution was evaporated; the residue amounted to 10.1 g. It was introduced into a 81 cm. long column of 1000 g. of aluminum oxide (neutral), prepared by introducing the aluminum oxide with chloroform. At first, the impurities present in the residue which were apparent as a brown zone were removed with the aid of about 1.3 liter of chloroform. Then, the active substance was eluted with a mixture of ethanol and concentrated ammonia in a proportion by volume of 4:1 as a characteristic light yellow zone. Upon concentration of the eluate, the active substance crystallized. After recrystallization from absolute ethanol, 1.41 g. of colorless needles melting at 167.5° C. were obtained.

The same result was obtained when using a mixture of ethanol and diethylamine in a proportion by volume of 20:1 for isolating the active substance by chromatography on basic aluminum oxide.

EXAMPLE 3

798 g. of ground roots of *Cabucala madagascariensis* were freed from fat as described in Example 1 with 1.8 liters of petroleum ether and extracted for 3½ hours at about 50° C. with 1.8 liters of methanol. The dry residue obtained as described in Example 2 amounted to 57.6 g. and was stirred with 150 ml. of 0.5 N-sulfuric acid at room temperature. After filtration, the sulfuric solution (pH 3.1) was adjusted to pH 9 by means of a concentrated ammonia solution. Thereby, a yellow precipitate separated which was filtered off, washed with water and dried under strongly reduced pressure at 40° C. 14 g. of product were obtained.

The active substance was isolated by chromatography as described in Example 1, paragraph 2, from the dried product obtained by the precipitation with ammonia, with the exception that a mixture of n-propanol and concentrated ammonia in a proportion by volume of 19:1 was used as eluant. The pure active substance was found to be identical with the products obtained according to Examples 1 and 2. The yield was 0.91 g.

We claim:

1. The pharmaceutically active substance having the following characteristic properties (a): Percentage composition
Carbon ------------------------------- 69.6
Hydrogen ----------------------------- 7.1
Nitrogen ----------------------------- 7.3
Oxygen ------------------------------- 16.6

(b) Melting point: 167.5° C.;

(c) Molecular weight: 382 (mass spectroscopically);
(d) Empirical formula: $C_{22}H_{26}O_4N_2$;
(e) Ultraviolet spectrum (in methanol): maxima at 227 and 279 millimicrons;
(f) Infrared spectrum (in $CHCl_3$): as in the accompanying drawing.

2. A salt formed between the pharmaceutically active substance of claim 1 and a physiologically tolerated acid selected from the group consisting of hydrochloric, sulfuric, acetic, lactic, and tartaric acids.

3. A pharmaceutical composition having blood pressure lowering activity consisting essentially of 1–50 milligrams, per dosage unit, of the pharmaceutically active substance of claim 1 and a pharmaceutically acceptable carrier.

4. A pharmaceutical composition having blood pressure lowering activity consisting essentially of 1–50 milligrams, per dosage unit, of the pharmaceutically active substance of claim 2 and a pharmaceutically acceptable carrier.

5. The method of lowering blood pressure in a mammal which comprises administering to said mammal from 1–50 milligrams, per dosage unit, of the pharmaceutically active substance of claim 1.

6. The method of lowering blood pressure in a mammal which comprises administering to said mammal from 1–50 milligrams, per dosage unit, of the pharmaceutically active substance of claim 2.

7. The method of making the pharmaceutically active substance of claim 1, which method comprises extracting dried *Cabucala madagascariensis* with alkanol having 1–4 carbon atoms or with a member selected from the group consisting of trichloroethylene, trichloroethane, methylene chloride, and chloroform; drying the extract; acidifying the dried extract with hydrochloric, sulfuric, or acetic acid at a concentration of 0.1–4 N; alkalinizing the acid solution to a pH between 8 and 9 with sodium hydroxide, potassium hydroxide, or ammonium hydroxide, whereby a precipitate is formed; extracting this precipitate with an aliphatic chlorohydrocarbon selected from the group consisting of trichloroethylene, trichloroethane, methylene chloride, and chloroform; chromatographing this extract on silica gel or aluminum oxide; eluting the active substance with alkanol having 1–4 carbon atoms made basic with ammonia, diethylamine, or dimethyl formamide; and recovering the active substance from the eluant by evaporation of the latter.

8. The method as in claim 7 wherein, prior to the first-recited extraction, the dried *Cabucala madagascariensis* is extracted with a member selected from the group consisting of petroleum ether, pentane, and hexane.

References Cited
UNITED STATES PATENTS
3,565,990    2/1971    Groebel et al. _____ 424—195

JEROME D. GOLDBERG, Primary Examiner